United States Patent [19]

Matsuzawa

[11] Patent Number: 4,675,988
[45] Date of Patent: Jun. 30, 1987

[54] METHOD FOR PRODUCING A MAGNETIC HEAD CORE

[75] Inventor: Soichiro Matsuzawa, Kuwana, Japan

[73] Assignee: NGK Insulators, Ltd., Japan

[21] Appl. No.: 683,491

[22] Filed: Dec. 19, 1984

[30] Foreign Application Priority Data

Dec. 27, 1983 [JP] Japan ................... 58-246262

[51] Int. Cl.⁴ .............................................. G11B 5/42
[52] U.S. Cl. ...................................... 29/603; 360/127
[58] Field of Search ............... 29/603; 360/127; 65/43

[56] References Cited

U.S. PATENT DOCUMENTS 3,094,772  6/1963  Duinker ................................ 29/603
3,479,738  11/1969  Hanak ................................... 29/603

FOREIGN PATENT DOCUMENTS 0039593  11/1981  European Pat. Off. .
0053481  6/1982  European Pat. Off. .
1388734  3/1975  United Kingdom .
2022306  12/1979  United Kingdom .

OTHER PUBLICATIONS

Patent Abstract 56-29823, vol. 5, No. 84 (P-64) (756) Jun. 2, 1981 "Magnetic Head of Junction Ferrite".
Patent Abstract 54-134613, vol. 3, No. 155 (E-160) Dec. 19, 1979 "Magnetic Head".
Patent Abstract 57-18011, vol. 6, No. 82 (P-116) (960) May 20, 1982 "Production of Ring-Shaped Magnetic Head".

Primary Examiner—Carl E. Hall
Attorney, Agent, or Firm—Parkhurst & Oliff

[57] ABSTRACT

A magnetic head core consisting of plural core elements of ferrite butted and bonded together through solid-solid reaction so as to form a generally annular magnetic circuit having a magnetic gap. At least opposed portions of the magnetic circuit which define the magnetic gap and provide magnetic-medium contacting surfaces are formed of a single crystal of ferrite. At least one of the plural core elements is originally an at least partially monocrystalline block of ferrite including a monocrystalline portion consisting of a ferrite single crystal, and at least one of the opposed portions defining the magnetic gap is monocrystallized as a result of growth of the ferrite single crystal of the monocrystalline portion toward the original ferrite polycrystal of the core elements.

8 Claims, 7 Drawing Figures

METHOD FOR PRODUCING A MAGNETIC HEAD CORE

BACKGROUND OF THE INVENTION

The present invention relates generally to a core of a magnetic head and a method of producing such a magnetic head core, and more particularly to a magnetic head core formed of ferrite with a magnetic gap, which has substantially no rear or back gap opposite to the magnetic gap and which is improved in wear resistance and cost of manufacture, and to a method of manufacturing the same.

In the art of magnetic heads for various types of recording media, a core made of ferrite has been known, which generally consists of a pair of ferrite core elements joined together to form a structure of a ring-shaped or a toric cross section having a centrally located large aperture or void which facilitates winding of coils around the core elements. More specifically, referring to FIG. 1, which shows a common type of magnetic head core, a pair of generally C-shaped ferrite core halves 2, 4 are butted together to form the core with a central aperture 6 which serves as a space for winding coils 8 around the core halves 2, 4. In this manner, an annular or toric magnetic circuit is constituted by the two C-shaped ferrite core halves 2, 4. Additionally, the toric magnetic core structure is formed with a magnetic gap 10 at one end portion of the core. The gap 10 is formed to extend across the toric magnetic circuit and has a suitable width $\alpha$ which is the distance between the opposed end surfaces of the core halves 2, 4. As is well known in the art, a magnetic tape 12, magnetic disk or other magnetic recording medium, is slidably moved on outer contact surfaces of the core halves 2, 4 in the proximity of the magnetic gap 10 defined by these halves 2, 4, whereby magnetic writing (recording) and reading (reproducing) processes are effected.

Figure 1:
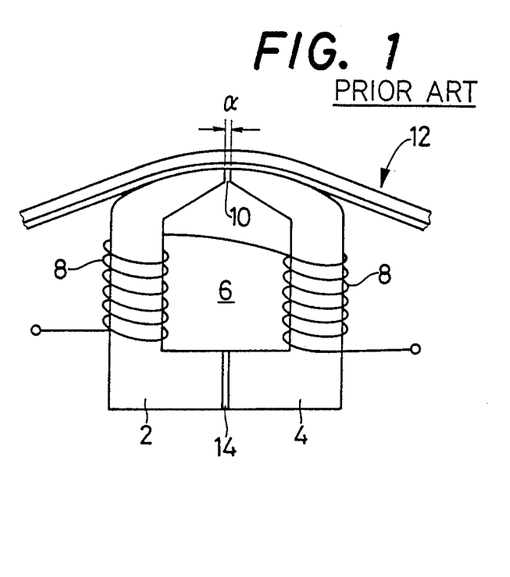
FIG. 1 is an illustration of a magnetic head arrangement known in the prior art.

As indicated above, the ends of the core halves 2, 4 at one end of the core have the opposed surfaces which are spaced apart from each other by a distance equal to the width $\alpha$ of the magnetic gap, while the other ends of the core halves 2, 4 are bonded together with suitable bonding glass so as to maintain a generally toric cross sectional shape of the magnetic core as a whole. In this known ferrite core formed of the two core elements 2, 4 bonded together with glass, however, it is inevitable that a very small gap 14, a so called rear or back gap, is formed between the bonded abutting surfaces of the core elements 2, 4. The existence of this rear gap 14, which is located opposite to the magnetic gap 10 at the front of the core, necessarily increases the magnetic resistance of the magnetic circuit, and consequently has an adverse effect on the sensitivity, and signal to noise ratio (S/N ratio) of a magnetic head using the core, which sensitivity and S/N ratio are important characteristics of the magnetic head. In other words, it is required to completely eliminate the rear gap 14, i.e., to reduce the width of the gap to zero in order to maximize the sensitivity of the magnetic head, and accordingly improve the S/N ratio. However, this requirement has not been satisfied by any conventional ferrite core formed from a plurality core members or elements as described above.

When these core elements 2, 4 of the core are both made of ferrite polycrystal, there have been experienced troubles that the surfaces in the vicinity of the magnetic gap are subject to uneven wear due to their relative sliding contact with a magnetic recording medium such as the magnetic tape 12, and that grains of the polycrystalline ferrite drop out from opposed surfaces defining the magnetic gap, during the process of forming such gap-defining surfaces, thus causing the gap-defining surfaces to be rough having small indentations and projections. In view of these troubles, it is considered to form the core elements 2, 4 from a single crystal of ferrite. In this case, there arises another problem in addition to the presence of the aforementioned rear gap at the abutting portions of the elements. That is, extremely expensive single crystal ferrite should be used for the plurality of core elements, and the material cost of the core is accordingly increased. When relatively large ferrite core elements are required to fabricate a relatively large core, correspondingly large single crystal ferrite blocks are required, which pushes up the cost of manufacture of the core and requires a higher level of technology.

SUMMARY OF THE INVENTION

It is accordingly an object of the present invention to provide a magnetic head core which has substantially no rear gap and an improved wear resistance, and a method of producing such a core.

Another object of the invention is the provision of such a magnetic head core of a generally ring-shaped integral structure which is formed from a plurality of core elements of ferrite with a narrow magnetic gap, and which provides for improved sensitivity and signal-to-noise ratio of the magnetic head, and an easy and economical method of producing the same.

According to the present invention, there is provided a magnetic head core of generally a ring shape having a coil-winding aperture for winding coils, and forming a generally annular magnetic circuit, wherein a magnetic gap of a predetermined width is formed transversely across the annulus of the magnetic circuit, characterized in that the magnetic circuit consists of a single crystal of ferrite.

According to another aspect of the invention, the magnetic circuit consists of a plurality of core elements of ferrite butted together into a generally ring-shaped assembly and bonded together at mutually abutting surfaces by means of solid-solid reaction or solid-phase reaction. At least opposed portions of the magnetic circuit which define the magnetic gap and provide contacting surfaces with which a magnetic recording medium is slidably contacted, are formed from a single crystal of ferrite. At least one of the plurality of core elements is originally an at least partially monocrystalline block of ferrite including a monocrystalline portion consisting of a ferrite single crystal. At least one of the opposed portions defining the magnetic gap is monocrystallized as a result of growth of the ferrite single crystal of the partially monocrystalline block toward originally polycrystalline portions of the core elements.

In the ferrite magnetic head core of the invention constructed as described above, the generally annular magnetic circuit is formed from a single crystal of ferrite, and therefore there exists no heterogenous phase in the magnetic circuit. In particular, the core consists of a plurality of core elements which are directly bonded together through solid-solid reaction or solid-phase reaction, and is substantially free of such rear or back gap that is inevitably present in the known core, wherein the core elements are bonded together with a bonding glass. Accordingly, the core of the invention suffers virtually no magnetic resistance due to such a rear gap, and the use of the instant core effectively improves the sensitivity and signal-to-noise ratio of a magnetic head.

Further, it will be obvious that the use of two or more ferrite core elements according to the invention to constitute an integral core assembly permits easy formation of the magnetic gap with a desired width between the opposed core elements. This means that the magnetic gap is easily formed with a relatively small width, ranging from 0.4 microns to 3 microns approximately. The core with such a narrow magnetic gap is suitably usable for magnetic heads for VTR and computer applications.

As indicated above, an at least partially monocrystalline block of ferrite may be advantageously used as one of the plurality of core elements. This partially monocrystalline block includes a monocrystalline portion consisting of a single crystal of ferrite. As a result of growth of the ferrite single crystal of this partially monocrystalline block, at least one of the opposed portions defining the magnetic gap is monocrystallized. In other words, the other core elements used may be wholly polycrystalline blocks of ferrite. Therefore, the number of expensive blocks of ferrite single crystal, or the amount of use of such costly monocrystalline ferrite material, is minimized, and consequently the cost of manufacture of the core is effectively reduced. In addition, the use of a plurality of ferrite core elements, one of which is at least partially monocrystalline, eliminates the need for a large block of ferrite single crystal to manufacture a relatively large ferrite core, and obviates the difficulty in producing such a large-sized monocrystalline ferrite block.

According to the invention, there is also provided a method of producing a magnetic head core as described above. This method comprises the steps of: preparing as one of a pair of ferrite core elements a polycrystalline block of ferrite polycrystal showing discontinuous grain growth, and as the other core element an at least partially monocrystalline block of ferrite including a monocrystalline portion which consists of a ferrite single crystal; butting together the polycrystalline block and the at least partially monocrystalline block into an assembly such that the opposed portions define the magnetic gap at one end portion of the assembly of the two blocks; heating the assembly of the two blocks and bonding the blocks together by means of solid-solid reaction at mutually abutting surfaces thereof; and causing the ferrite single crystal of said monocrystalline portion of the at least partially monocrystalline block to grow toward the polycrystalline block and/or toward the ferrite polycrystal of the at least partially monocrystalline block, and thereby monocrystallizing at least one of said opposed portions so that both of the opposed portions defining the magnetic gap and providing medium-contacting surfaces with which a magnetic recording medium is slidably contacted, are made of ferrite single crystal.

In accordance with the above-described method of the invention, the magnetic head core constructed also according to the invention and having the foregoing features is easily and economically manufactured. According to an advantageous embodiment of the instant method, a pair of elongate blocks of ferrite are used as the polycrystalline block and the at least partially monocrystalline blocks. These elongate ferrite blocks are butted and bonded together through solid-solid reaction or solid-phase reaction into an elongate assembly having a cross sectional shape corresponding to the generally annular magnetic circuit. The elongate assembly of the bonded two elongate blocks are cut in parallel planes perpendicular to the length of the assembly. In this instance, the magnetic head core of the invention is obtained in plural number from a pair of elongate blocks of ferrite. Thus, the manufacturing economy is considerably boosted.

According to another embodiment of the method of the invention, the mutually abutting surfaces at which the two blocks are bonded together are disposed at the other end portion of the assembly remote from the magnetic gap at said one end of the assembly, and the growth of the ferrite single crystal of the monocrystalline portion of the at least partially monocrystalline block proceeds across the mutually abutting surfaces of the two blocks which have been bonded together by solid-solid reaction at the other end portion of the assembly.

According to an alternative embodiment of the instant method, the assembly of the two blocks has a first pair of mutually abutting surfaces on said opposed portions of the two blocks at said one end portion of the assembly, and a second pair of mutually abutting surfaces at the other end portion thereof, the first pair of mutually abutting surfaces being disposed outside said magnetic gap. The growth of the ferrite single crystal of the monocrystalline portion of the at least partially monocrystalline block proceeds across the first and second pairs of mutually abutting surfaces of the two blocks which have been bonded together by a solid-solid reaction at said one and other end portions of the assembly. In this case, at least one of the opposed portions defining the magnetic gap is monocrystallized through the growth of the ferrite single crystal across said first pair of mutually abutting surfaces adjacent to the magnetic gap. This indicates that it is not always necessary to form the ferrite core of a single crystal. According to the instant method of the invention, at least the opposed portions defining the magnetic gap and their vicinities are easily and suitably monocrystallized through the aforementioned growth of the ferrite single crystal.

The core elements used to form a ferrite core according to the invention are made of ferrite materials such as Mn-Zn ferrite and Ni-Zn ferrite, which are selected depending upon the specific applications of the ferrite core. As a rule, the plurality of core elements used in the invention are made of the same ferrite materials. Further, it is important to use, as one of the core elements, a monocrystalline ferrite element at least a portion of which is made of a ferrite single crystal. The monocrystalline portion of the ferrite element grows toward a polycrystalline ferrite portion or portions. Although this at least partially monocrystalline ferrite element may be wholly made of a single crystal of ferrite, it is economically advantageous to use a composite of monocrystalline and polycrystalline ferrite structures, at least a portion of which is made of a single crystal.

While the ferrite core element or elements other than the at least partially monocrystalline ferrite element have a polycrystalline ferrite structure originally made of ferrite polycrystal, it is required that the polycrystalline ferrite elements undergo discontinuous grain growth. Stated more specifically, the polycrystalline ferrite element used according to the invention should be ferrite polycrystal wherein when the firing temperature is elevated beyond a critical point, some of the grains suddenly start to grow at a rate extremely higher than that of the surrounding microcrystal grains, and integrate or unite these surrounding grains, thereby growing into a giant single crystal (single macrocrystal). This property of polycrystalline ferrites is disclosed in greater detail in Japanese Patent Applications, Serial Nos. 54-67893, 55-59167 and 55-16644, which were filed in the name of the assignee of the present application and laid open Dec. 17, 1980, Dec. 1, 1981 and June 9, 1982 under Publication Nos. 55-162496, 56-155100 and 57-92599, respectively. Such polycrystalline ferrite materials as disclosed in these Applications are usable in this invention.

According to the invention, each of the core elements of ferrite polycrystal exhibiting the above-indicated discontinuous grain growth is generally prepared by press-forming and sintering a mixture mass of ferrite powders comprising an iron oxide which is one of major components of the powder mass, and which contains an iron oxide of a spinel structure and/or an iron oxide having spinel structure hysteresis in a total amount of not less than 60% by weight, calculated as $Fe_2O_3$. The ferrite polycrystal is contacted with a ferrite single crystal of the adjacent monocrystalline core element, and the single crystal grows in the direction toward the polycrystal, whereby the microcrystal grains in the polycrystal are integrated with the single crystal with a result of growing the single crystal.

BRIEF DESCRIPTION OF THE DRAWINGS

The foregoing and other objects, features and advantages of the present invention will be better understood from reading the following preferred embodiments taken in connection with the accompanying drawing in which.

DETAILED DESCRIPTION OF THE PREFERRED EMBODIMENTS

Referring to FIGS. 2-7 of the accompanying drawings, several embodiments of a magnetic head core and a method of the invention will be described in detail.

Figure 2:
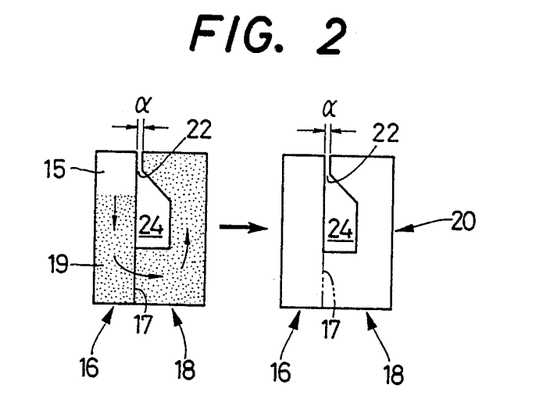
FIG. 2 is a view illustrating the process of assemblying one embodiment of a magnetic head core of the invention, and the construction thereof.

There are first shown in FIG. 2 a pair of core elements 16, 18 of ferrite which are butted together at abutting surfaces 17, as shown on the left hand side of FIG. 2, so that a generally annular magnetic circuit is formed. The element 16 is a partially monocrystalline core element having a monocrystalline portion 15 consisting of a ferrite single crystal, and the other element 18 is a wholly polycrystalline core element. The mutually abutting surfaces of portions 17 of the two ferrite core elements 16, 18 are bonded together through solid-solid reaction or solid-phase reaction, and a generally ring-shaped integral assembly 20 is obtained as a ferrite core of the invention, as depicted on the right hand side of the figure, wherein substantially no bonding boundary interface (17) (rear gap) is present between the bonded core elements 16, 18 at one end portion of the ferrite core 20. The monocrystalline or single crystal portion 15 of the partially monocrystalline element 16 is caused to grow toward a polycrystalline portion 19, and the growth of the single crystal further proceeds across the bonding boundary interface 17 toward the wholly polycrystalline element 18 as indicated by the arrows in the figure, whereby the entirety of the integral magnetic circuit assembly, i.e., ferrite core 20 is monocrystallized. At the other end portion of the core 20, opposite to the bonded portions of the elements 16, 18, there is formed a magnetic gap 22 which is defined by opposed end surfaces of the partially monocrystalline and wholly polycrystalline core elements 16, 18. The magnetic gap 22 is formed transversely across the annulus of the magnetic circuit of the core 20, and has a predetermined width $\alpha$ which is the distance between the opposed end surfaces of the core elements 16, 18. The core element 18 has a recess or groove and cooperates with the core element 16 to form a centrally located aperture 24, which facilitate a process of winding coils around the core elements 16, 18. It will be obvious that as a result of the aforementioned monocrystallization due to the single crystal grain growth, the opposed end portions of the elements 16, 18 defining the magnetic gap 22 and providing contact surfaces for a magnetic recording medium consist of a single crystal of ferrite.

Figure 3:
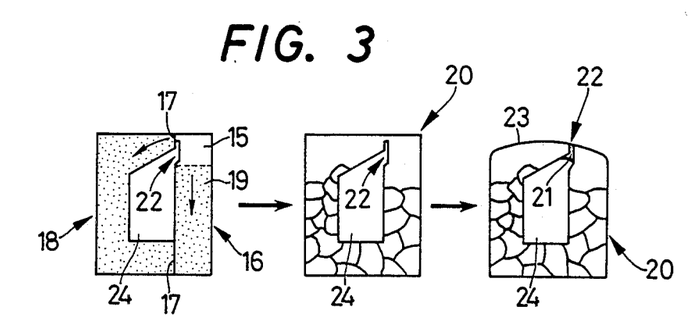
FIG. 3 is a view corresponding to FIG. 2, showing another embodiment of the invention.
Figure 4:
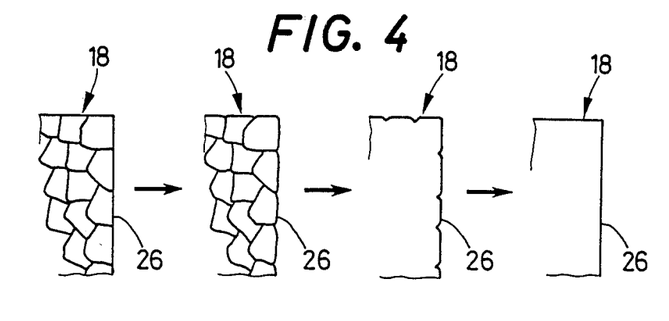
FIG. 4 shows the process in which a ferrite polycrystal with a thermally etched surface is changed into a ferrite single crystal with recovery of the etched surface into a flattened smooth surface.

The magnetic head core of the invention is suitably and advantageously prepared through solid-solid reaction and monocrystallization, as illustrated in FIG. 3.

More particularly, the partially monocrystalline core element 16 and the wholly polycrystalline core element 18 are butted together at their opposite ends such that the magnetic gap 22 is defined by the opposed end surfaces which are located inside the abutting portions at one end of the butted assembly. In this condition, the core elements 16, 18 are heated, and the abutting portions are bonded together. In the meantime, the monocrystalline or single crystal portion 15 partially defining the magnetic gap 22 and serving as the medium-contacting portion grows toward the polycrystalline portions of the elements 16, 18 as indicated by arrows on the left-hand side of FIG. 3. Described in more detail, the monocrystalline portion 15 of the partially monocrystalline element 16 is directly contacted with the medium-contacting end portion of the wholly polycrystalline element 18, and thereby bonded thereto. With this direct abutting contact, the monocrystalline portion 15 grows across the abutting interface 17 outside the magnetic gap 22, and the single crystal growth progresses in the polycrystalline element 18. Thus, the obtained ferrite core 20 is of a single crystal structure at least at its medium-contacting end portion in the vicinity of the magnetic gap 22.

In the middle and right-hand side views of FIG. 3, the crystal structure of the ferrite core 20 upon rapid heating thereof is illustrated. As described later, the ferrite core 20 is not entirely monocrystallized, but the middle and rear portions of the core 20 are polycrystalline structures with comparatively large grain size due to discontinuous grain growth.

The ferrite core 20 thus obtained through solid-solid or solid-phase reaction bonding and monocrystallization, is then subjected to a process of filling the magnetic gap 22 with protective glass 21. Subsequently, the core 20 is cut at the end of the magnetic gap 22 to remove the front bonded portion outside the gap 22, so that the gap 22 is exposed to the outside and the medium-contacting surface 23 is formed adjacent to the gap 22, for sliding contact with a magnetic tape or other magnetic recording medium. In this manner, the ferrite core 20 of the invention is provided with the generally annular magnetic circuit having the magnetic gap of a suitable size.

The medium-contacting surface 23 of the core 20 is given a desired curvature as shown, or is formed to be generally flat. Subsequently, coils are wound around the core 20, by utilizing a space of the coil-winding aperture 24 provided in the annulus of the magnetic circuit. Thus, the intended magnetic head core is finally obtained.

In butting the two core elements 16, 18 together, it is desired to apply a ferrite-dissolving acid such as hydrochloric acid, nitric acid or sulfuric acid to the mutually abutting surfaces. Such an acid is applied for the purpose of forming salts of the ferrite component such as iron nitrate, manganese nitrate and zinc nitrate, which serves to secure the core elements 16, 18 relative to each other, and which is decomposed into oxides, upon subsequent heat application. These oxides function to accelerate the solid-solid reaction or solid-phase reaction of the core elements 16, 18, which results in the bonding of the two elements. In place of the above indicated acids, it is possible to use a solution of inorganic salt including a ferrite component, which solution produces almost the same effects and results as the acids, upon abutting bonding of the two core elements 26, 40.

According to the method of the invention, the integral solid-solid reaction bonding of the partially monocrystalline core element 16 and the wholly polycrystalline core element 18, and the monocrystallization of the ferrite polycrystal of the element 18, will take place concurrently and continuously. Since the sintering of the core elements 16, 18 through solid-solid reaction occurs at a temperature of about 1100° C., it is required that the mutually abutting portions of the elements be heated to 1100° C. or higher to obtain direct bonding of the abutting portions. It is further noted that the monocrystallization or single crystal grain growth incident to the solid-solid reaction bonding will start at a temperature below a point at which the discontinuous grain growth starts in the ferrite polycrystal (1380° C., in the following Example), more specifically, start at a temperature 50° C. lower than that point (1330° C. in the Example). Therefore, the monocrystallization of the entire ferrite polycrystal is possible by slowly elevating the heating temperature (at a rate of 20° C./hr, for example) from about 1350° C.

If it is sufficient to monocrystallize only the medium-contacting portion and its vicinities of the ferrite core 20 adjacent the surface 23 as shown in FIG. 3, the heating may be conducted at a relatively higher rate, e.g., at 300° C./hr. In this instance, the ferrite polycrystal of the elements 16 and 18 undergoes a discontinuous grain growth, and monocrystalized solely at its portion near the monocrystalline portion 15 of the element 16, due to the single crystal growth of the latter. However, the polycrystalline structures of the elements comparatively distant from the monocrystalline portion 15 are not monocrystallized, but their original microcrystal grains on the order of some tens of microns are grown to relatively large macrocrystal grains (polycrystal) of several millimeters. Even though such macrocrystal grains exist in the ferrite core 20, the object of the present invention is sufficiently attained, as long as the opposed end portions defining the magnetic gap 22 are ferrite single crystal.

Even after the wholly polycrystalline core element 18 has been monocrystallized in part or completely through the single crystal growth, that is, even after termination of the single crystal growth in the core 20, it is desired to maintain an core at the elevated temperature so that a surface 26 of the element 18 partially defining the magnetic gap 18 is effectively flattened or smoothed. Described more specifically, referring to FIG. 4, the gap-defining surface 26 of the wholly crystalline element 18 is thermally etched prior to the monocrystallization, and indented at the grain boundaries. Consequently, the surface 26 immediately after the monocrystallization is rough or uneven. The recovery of the gap-defining surface 26 from this uneven state is not achieved immediately after completion of the monocrystallization. To remedy this defect, the core 20 is kept at an elevated temperature, preferably higher than the monocrystallization temperature, for a suitable time span after the monocrystallization, during which the thermally etched rough surface 26 is smoothed.

Generally, the heating operation of the assembly of the ferrite core elements 16, 18 for the solid-solid reaction and monocrystallization is conducted in a heating furnace. The atmosphere in the heating furnace is important to maintain the characteristics of the ferrite, and should be carefully selected, since the characteristics of the ferrite are considerably deteriorated through oxidation or reduction in the heating process. Consequently, it is important to use the atmosphere whose oxygen partial pressure is equal to that of the ferrite, i.e., equilibrated oxygen partial pressure. Whereas, the control of the oxygen partial pressure of the heating atmosphere is very difficult to achieve. The easiest method which is considered available is to heat the butted core elements 16, 18 in a heating box made of ceramics, such as alumina.

For adjusting the atmoshpere within such a ceramic heating box in which the ferrite core elements 16, 18 are introduced, it is generally desired to introduce therein a dummy member in the form of powder or sheet of the same ferrite as the core elements. During the heating of the ferrite core elements 16, 18, the dummy ferrite member discharges and absorbs oxygen, thereby functioning to adjust the oxygen concentration of the atmosphere in the ceramic heating box.

Figure 5:
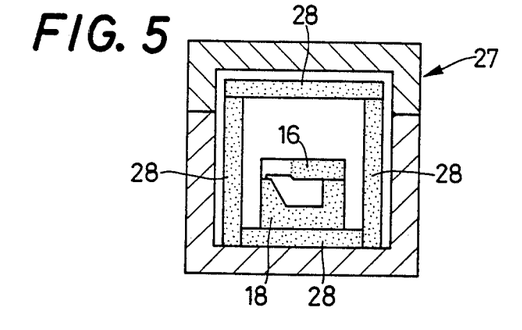
FIG. 5 is a cross sectional view showing a core assembly of ferrite core elements of the invention accommodated in an alumina heating box.

An example of such heating arrangement is illustrated in FIG. 5, wherein the assembly of the core elements 16, 18 is accommodated in an alumina box 27 such that the assembly is enclosed by ferrite dummy plates 28 also disposed in the alumina box 27. This box 28 loaded with the core elements 16, 18 and dummy plates 28 is introduced in a heating furnace.

Figure 6:
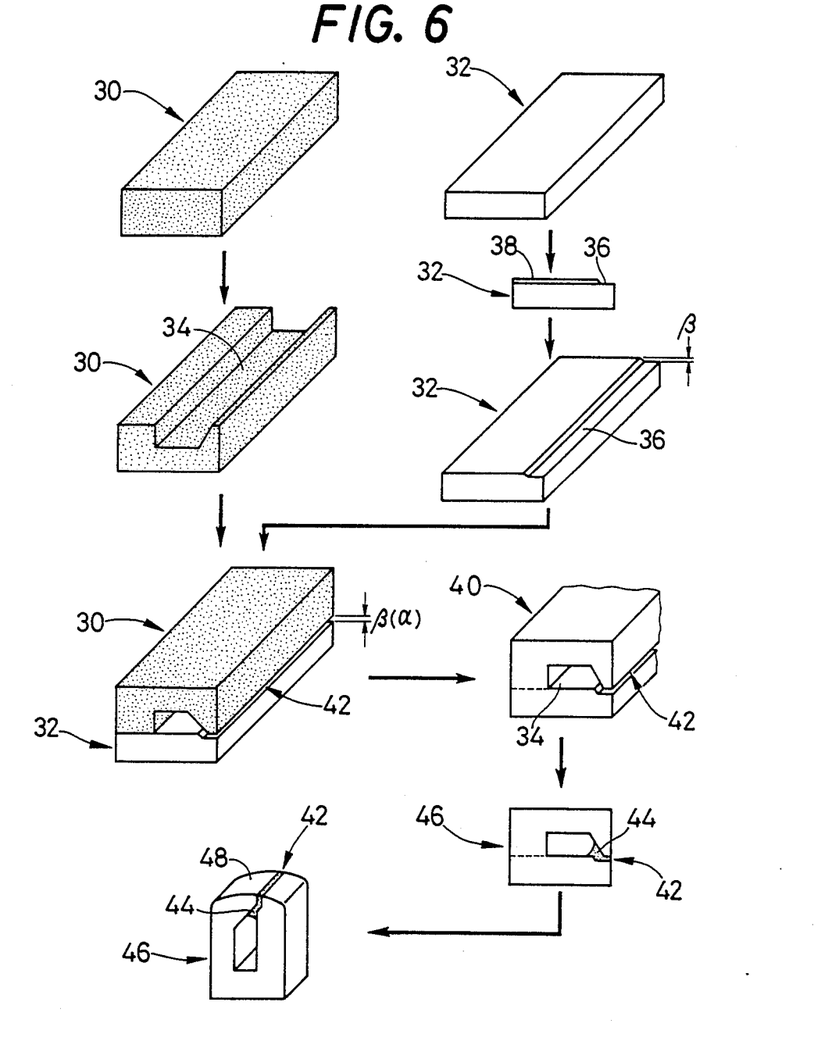
FIGS. 6 and 7 show the steps of producing a magnetic head core of the invention according to different embodiments of a method of the invention.
Figure 7:
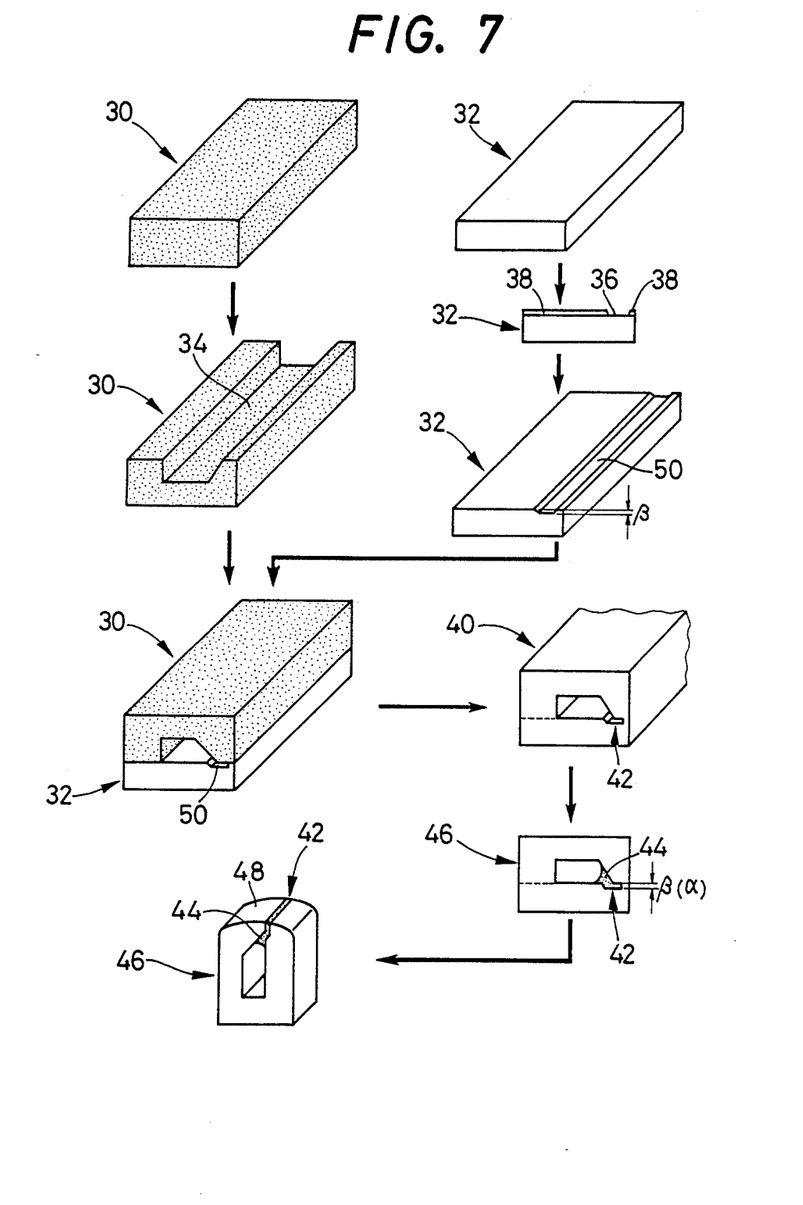

While the steps of production according to the invention have been described referring to specific examples of FIGS. 2–5, wherein a single ferrite core is produced from the core elements 16, 18, it is appreciated, from the economic and commercial point of view, to use a pair of elongate blocks of ferrite as shown in FIGS. 6 and 7, for producing a plurality of ferrite cores from a bonded assembly of these two elongate ferrite blocks by cutting the completed assembly into the individual cores of suitable dimensions.

Stated more specifically with reference to FIG. 6, the pair of elongate rectangular blocks of ferrite 30, 32 are used as the starting materials. The block 30 is wholly polycrystalline while the block 32 is a ferrite single crystal. The wholly polycrystalline block 30 is subjected to a groove forming process for forming a groove 34 which partially defines an aperture for facilitating a subsequent process of winding coils. Additionally, the single crystal or monocrystalline block 32 is coated, except at a gap-defining surface 36, with a chemically resistant film 38, and then subjected to a chemical etching process to remove stock from the gap-defining surface 36 to a depth $\beta$ corresponding to a width of a magnetic gap.

Usually, the groove 34 is formed in the wholly crystalline block 30 by cutting with a diamond cutter. However, it is alternatively possible to press-mold the block 30 with such a groove.

The stock removal from the monocrystalline block 32 to the depth $\beta$ to provide the gap-defining surface 36 is suitably accomplished by chemical etching, usually by using inorganic acids as an etching agent, such as hydrochloric acid, nitric acid, sulfuric acid, phosphoric acid, or mixtures or aqueous solutions thereof. However, the use of phosphoric acid is most preferred for improved straightness of the finished surface. The chemical etching process for the stock removal may be replaced by a suitable grinding process. The use of an ordinary blade such as a diamond blade does not generally permit sufficiently high accuracy of removing the stock exactly by a predetermined depth $\beta$, e.g., a few or several microns. According to the method of the invention, therefore, the grinding process is carried out by a rotary blade whose peripheral portion is made of a soft material such as rubber and polyurethane and contains abrasives of diamond. The blade containing the diamond abrasives is applied to the gap-defining surface 36 with a slight pressure exerted, such that the stock is removed at a low rate. Thus, the intended gap-defining surface 36 is obtained.

When the stock removing process is achieved by chemical etching, it is desired to etch the single crystal surface of the monocrystalline block 30, rather than the polycrystalline block 32, because the polycrystalline structure is not etched consistently due to a difference in the direction of crystal grains and the etched surface tends to be rough. Further, even when the single crystal or monocrystalline block 32 is subjected to chemical etching, it is preferred to select the type of crystal face. That is, the crystal face (110) tends to suffer from the generation of oblique line scratches as a result of etching. To avoid this defect, it is recommended to select symmetrical crystal faces, that is, the crystal face of the type (111) or (100). For the reasons stated above, it is particularly preferred that the single crystal block 32 has the crystal face (111) or (100).

The polycrystalline block 30, with the groove 34, and the single crystal block 32, with the gap-defining surface 36, are superposed on each other in a mutually abutting relationship, and heated for sintering and integral bonding through a solid-solid reaction at the abutting portions, whereby an elongate bonded assembly or core block 40 is prepared, with a magnetic gap 42 formed between the two blocks 30, 32. Moreover, the ferrite polycrystal of the polycrystalline block 30 is entirely monocrystallized due to single crystal growth of the ferrite single crystal of the block 32 which is held in abutting contact with the ferrite polycrystal, in the same manner as described in association with the example of FIG. 2. As a result, even the opposed end portions defining the magnetic gap 42 and serving as medium-contacting portions are monocrystallized.

Subsequently, the magnetic gap 42 formed in the elongate core block 40 is filled with a mass of glass 44, and then the core block 40 is cut in parallel planes perpendicular to its length at suitable intervals, whereby a plurality of ferrite cores 46 of the same size are obtained one after another. Prior to or following this cutting process, the assembly 42 is subjected to a suitable process for forming a contact surface 48 with which a recording medium is brought into sliding contact.

The filling of the magnetic gap 42 with the glass 44 is effected by melting the glass 44 and pouring the melted glass into the gap 42. Generally, a suitable solid glass in the form of a rod or the like is located adjacent to the magnetic gap 42, and heated at 600°–900° C., so that the molten glass flows to fill the gap 42. As in the preceding heating process for solid-solid reaction and monocrystallization, the filling of the gap 42 with the glass 44 should be conducted in the atmosphere of equilibrated oxygen partial pressure. Since the temperature for melting the solid glass is lower than the solid-solid reaction and monocrystallization temperatures, this glass filling process is generally effected in a nitrogen ($N_2$) gas.

Another embodiment is shown in FIG. 7, which is different from the preceding embodiment of FIG. 6 that is the modification of the embodiment of FIG. 2. More particularly, the instant embodiment of FIG. 7 is a modification of FIG. 3 for increased economy of production on the commercial basis. The groove 34 is formed in the ferrite polycrystal of the block 30, while the surface of the monocrystalline block 32 is coated with chemically resistant films 38 which are not applied to the gap-defining surface 36. The thus coated surface of the monocrystalline block 32 is chemically etched to remove stock from the gap-defining surface 36 to form a gap-defining groove 50 with a depth $\beta$ which gives a predetermined width $\alpha$ of the magnetic gap 42.

In the next step, the thus processed two elongate core blocks 30, 32 are butted together as shown, and heated for solid-solid reaction at the abutting portions, as previously discussed. Thus, an integrally bonded elongate assembly (core block) 40 is obtained. Further, the ferrite single crystal of the block 32 grows across the butted and bonded interfaces at the transversely opposite ends of the assembly 40, and the ferrite polycrystal of the block 30 is comparatively effectively monocrystallized. Thus, the obtained elongate bonded core assembly 40 finally consists of a ferrite single crystal.

The bonded and monocrystallized elongate core assembly 40 is then subjected to a process of filling the magnetic gap 42 with the molten glass 44. Successively, the elongate assembly 40 is cut across its length at predetermined intervals along the length, for producing a plurality of ferrite cores 46 of the invention. Before each ferrite core 46 is completed, the pair of bonded portions adjacent to the magnetic gap 42 are cut off so that the gap 42 is exposed and the cut surface serves as the medium-contacting surface 48 for sliding contact with a magnetic recording medium. With the removal of the above pair of bonded portions, the core element blocks 30, 32 are bonded together solely at the other pair of bonded portions opposite to the cut-off portions.

Thus, the ferrite core 46 is finally formed with a generally annular magnetic circuit.

While the present invention has been described hitherto in its several preferred embodiments, it is to be understood that the invention is not limited thereto; but various changes, modification and improvements may occur to those skilled in the art without departing from the spirit and scope of the invention.

For example, while all of the illustrated embodiments use two core elements to constitute a magnetic head core of a generally ring-shaped cross section (annular magnetic circuit), it will be appreciated to use three or more core elements. While a monocrystalline core element used in the illustrated embodiments has a ferrite single crystal portion located adjacent to a magnetic gap, it is possible that the monocrystalline portion be located at the opposite end portion remote from the magnetic gap. In this case, the ferrite single crystal is grows in the ferrite polycrystal portions located on opposite sides of the magnetic gap, so that the opposed portions defining the gap consists of a ferrite single crystal.

As described hitherto, the instant method uses a combination of two or more elements of ferrite to constitute a ferrite core of the invention which has a generally annular or toroidal magnetic circuit. Since a magnetic gap is formed by opposed surfaces of the two separate core elements which are bonded together, the gap can be formed with a very small width, which is the distance between the two opposed core elements. Accordingly, the core of the invention is suitably applicable for magnetic heads for video tape recorders and computers, which require the head core to have a magnetic gap as small as 0.4 to 3 microns. According to the method of the invention, the core can be formed with such a small magnetic gap. Another important advantage of the invention resides in the manner of bonding the core elements through solid-solid reaction at the abutting portions of the elements. This solid-solid reaction bonding substantially elimnates otherwise possible presence of a gap at the abutting and bonding surfaces, i.e., a rear gap located remote from the magnetic gap at the front end of the core. The elimination of the rear gap results in a decrease in magnetic resistance of the core, which in turn contributes to improvement in the sensitivity and S/N ratio of the magnetic head.

Furthermore, the ferrite magnetic head core of the invention is monocrystalline at least at its portions in the vicinity of the magnetic gap and medium-contacting surfaces, thanks to the single crystal growth which has been discussed. Hence, the resistance to wear of the core caused by sliding contact of a magnetic recording medium is greatly increased. In addition, the use of ferrite polycrystal as one of the core elements makes a remarkable cntribution to saving of the manufacturing cost, as compared with the conventional methods wherein a ferrite single crystal is used to a relatively greater extent.

The invention is further illustrated by the following Example. It will be obvious that these examples are not construed to limit the scope of the invention.

EXAMPLE 1

According to the method illustrated in FIG. 6, a coil-winding groove (34) was formed in an elongate block (30) of ferrite polycrystal which has an average grain size of about 10 $\mu$m, and a porosity of 0.1%, and shows a discontinuous grain growth. Prior to this groove forming process, the ferrite polycrystal block (30) was polished for smooth abutting surfaces. Additionally, an elongate block (32) of a ferrite single crystal, which had also been pre-polished for smooth abutting surfaces, was coated with a suitable chemically resistant film (38), except in an area corresponding to a gap-defining surface (36). The ferrite single crystal block (32) was then immersed for 90 minutes in a conc. solution of phosphoric acid at 50° C. As a result, the gap-defining surface (36) was etched by a depth of 2 $\mu$m ($\beta$).

Subsequently, the processed ferrite polycrystal block (30) with the coil-winding aperture (34), and the ferrite single crystal block (32) with the gap-defining surface (36) were butted together at their end portions remote from the gap-defining surface (36), after a 6N nitric acid solution had been applied to the abutting surfaces. Successively, the butted elongate blocks were dried and introduced into a furnace. Successively, the blocks (30, 32) were heated to 1150° C. in a nitrogen gas, and further to 1350° C. in a nitrogen gas containing 10% oxygen, at a rate of 300° C./hr, and further to 1400° C. at a rate of 20° C./hr, whereby the ferrite single crystal block (32) was monocrystallized. Subsequently, the temperature was elevated to 1500° C. at 300° C./hr, and maintained at that temperature for 10 hours. Then, the blocks (30, 32) were cooled.

The obtained elongate integral core assembly (40) was taken out from the furnace. The observation revealed that the ferrite polycrystal of the block (30) had been monocrystallized into a ferrite single crystal having the same crystal system (axes) as that of the ferrite single crystal of the monocrystalline block (32). A magnetic gap (42) formed in the core assembly (40) was filled with molten glass 44, and the assembly (40) was finally cut in parallel planes perpendicular to its length, which planes are evenly spaced apart from each other along the length of the assembly. Thus, a plurality of magnetic head cores (46) were obtained. The front or top surfaces adjacent to the magnetic gap (42) were polished to a suitable convex curvature to provide a medium-contacting surface (48).

The measurement of the width of the magnetic gap (46) was 2 $\mu$m. A magnetic head using this core 50 was compared, in S/N ratio, with a magnetic head using a known core constituted by glass-bonded core elements. The magnetic head with the instant core (46) demonstrated 2 dB improvement in the S/N ratio over the known head. It was found that the instant core (46) had a significantly reduced magnetic resistance at the abutting portions of the two ferrite blocks. A 500-hour running test was conducted to check for wear of the medium-contacting surface (48). The test revealed no uneven wear of the surface (48) and showed a good sliding fit of a magnetic tape on the surface (48). The characteristics of the magnetic head were never changed or deteriorated after the long hours of sliding contact of the tape with the medium-contacting surface (48).

What is claimed is:

1. A method of producing a magnetic head core which is generally ring-shaped, including a pair of core elements of ferrite which form a generally annular magnetic circuit and have opposed portions defining a magnetic gap across the annulus of the magnetic circuit, comprising the steps of:

preparing as one of said core elements a polycrystalline block of ferrite polycrystal having discontinuous grain growth, and as a second core element an at least partially monocrystalline block of ferrite having a monocrystalline portion consisting of a ferrite single crystal;

butting together into contacting engagement said polycrystalline block and said at least partially monocrystalline block into an assembly such that said opposed portions define said magnetic gap at one end portion of said assembly of the two blocks;

heating said assembly of the two blocks and bonding said two blocks together by means of a solid-solid reaction at mutually abutting surfaces thereof; and growing the ferrite single crystal of said monocrystalline portion of said at least partially monocrystalline block toward a portion of the core selected from the group consisting of the ferrite polycrystal of said polycrystalline block and said at least partially monocrystalline block, thereby monocrystallizing at least one of said opposed portions such that both of the opposed portions defining said magnetic gap, and providing medium-contacting surfaces with which a magnetic recording medium is slidably contacted, consist essentially of ferrite single crystal.

2. The method of claim 1, wherein said mutually abutting surfaces are located at a second end portion of said assembly which is oppositely located from said magnetic gap at said one end portion of the assembly, and the growth of the ferrite single crystal of said monocrystalline portion of said at least partially monocrystalline block proceeds across said mutually abutting surfaces of said two blocks which have been bonded together by the solid-solid reaction at said second end portion of said assembly.

3. The method of claim 1, wherein said mutually abutting surfaces comprise a first pair of mutually abutting surfaces on said opposed portions of said two blocks at said one end portion of the assembly, and a second pair of mutually abutting surfaces at a second end portion thereof, said first pair of mutually abutting surfaces being disposed outside of said magnetic gap, and the growth of the ferrite single crystal of said monocrystalline portion of said at least partially monocrystalline block proceeds across said first and second pairs of mutually abutting surfaces of said two blocks, having been bonded together by the solid-solid reaction at said one end portion and said second end portion of the assembly.

4. The method of claim 3, wherein said ferrite single crystal of said monocrystalline portion of said at least partially monocrystalline block provides one of said medium-contacting surfaces.

5. The method of claim 1, wherein said polycrystalline block and said at least partially monocrystalline block comprise a pair of elongate blocks of ferrite which are butted together into contacting engagement and thereafter bonded together by means of a solid-solid reaction into an elongate assembly having a cross sectional shape corresponding to said generally annular magnetic circuit, said elongate assembly of the bonded two elongate blocks being cut along parallel planes perpendicular to the length of the elongate assembly, to form a plurality of magnetic head cores.

6. The method of claim 1, wherein the ferrite single crystal of said monocrystalline portion of said at least partially monocrystalline block comprises one of said opposed portions defining said magnetic gap, said ferrite single crystal having a crystal face selected from the group of crystal planes consisting of (111) and (100).

7. The method of claim 1, further comprising a step of maintaining said assembly of the two blocks at an elevated temperature for a predetermined amount of time for smoothing a surface portion of said at least one of said opposed portions which has been monocrystallized from the ferrite polycrystal.

8. The method of claim 1, wherein the ferrite single crystal of said monocrystalline portion is grown toward both the ferrite polycrystal of said polycrystalline block and toward said at least partially monocrystalline block.

* * * * *